Patented Sept. 18, 1951

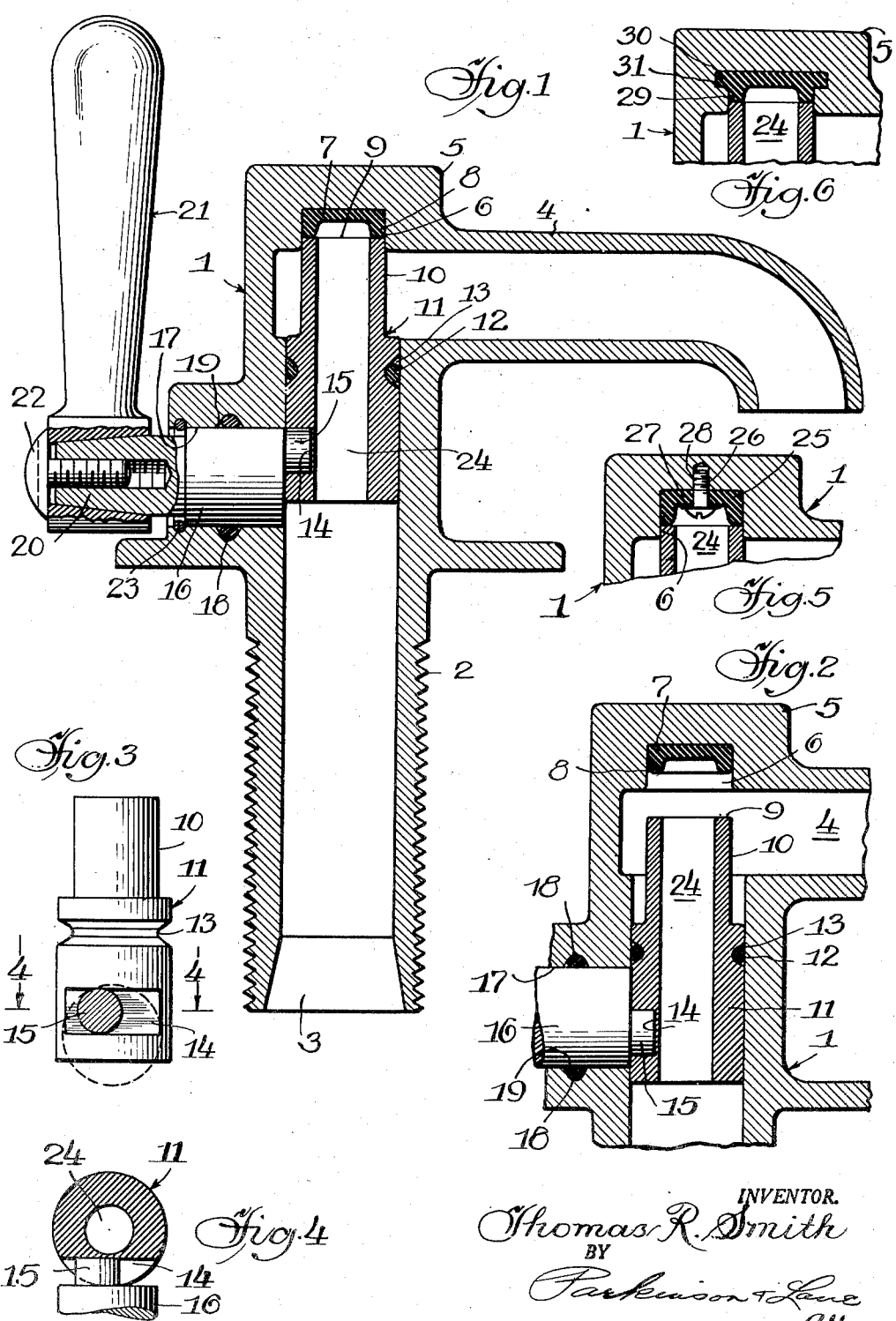

2,568,520

UNITED STATES PATENT OFFICE 2,568,520

ECCENTRIC TYPE FAUCET

Thomas R. Smith, Newton, Iowa, assignor to The Maytag Company, Newton, Iowa, a corporation of Delaware Application April 1, 1946, Serial No. 658,696

5 Claims. (Cl. 251—39)

The present invention relates to a novel faucet construction which is eccentrically operated and to a novel sealing arrangement therefor.

Among the objects of the present invention is the provision of a novel and simplified faucet assembly including a novel construction of valve plunger and resilient sealing element so constructed and related as to effect a self-sealing action.

The invention further comprehends a novel faucet body provided with a recess in the head thereof for reception of a resilient cup-shaped sealing element adapted to be retained therein by the pressure of the fluid and having sealing contact with a valve plunger slidable in the body.

Another important object of the present invention is to provide a novel faucet construction in which any siphoning back of dirty or contaminated water into the main system when the pressure in the system drops below atmospheric is prevented. This is accomplished by reason of the novel construction and arrangement of the valve seat and sealing element, the latter being loosely positioned in the valve body and should occasion arise where the pressure in the system drops below atmospheric, the sealing element is automatically held onto the valve seat on the plunger and will not be released when the valve handle is turned or moved to open position.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing—

Figure 1 is a view in vertical cross-section through the novel faucet assembly, the valve being shown in closed position.

Fig. 2 is a fragmentary view in vertical cross-section through the assembly and showing the valve in open position.

Fig. 3 is a view in front elevation of the valve plunger and showing the eccentric pin located in the transverse slot in the plunger.

Fig. 4 is a view in horizontal cross-section taken in a plane represented by the line 4—4 of Fig. 3.

Figs. 5 and 6 are fragmentary views in vertical cross-section through the sealing element and faucet body and showing alternate methods of anchoring the sealing element in position within a recess in the body.

An illustrative embodiment of the novel faucet assembly is shown in Figs. 1 to 4 of the drawing wherein the assembly comprises a faucet body 1 having a threaded connection or shank 2 provided with an inlet 3 and a discharge spout or nozzle 4. The head 5 of the body is provided with a recess 6 for the reception of a cup-shaped sealing element 7. This sealing element may be of any suitable resilient material such as natural or compounded synthetic rubber and is provided with a depending sealing lip 8 adapted to be engaged by the upper edge or valve seat 9 of the reduced end 10 of a plunger 11.

The plunger 11 is slidably mounted or carried in the body of the faucet and sealed therein by a resilient sealing ring 12 mounted in a substantially V-shaped groove 13, the sealing ring having its sealing face in wiping and sealing contact with the interior of the body 1. An elongated and transversely disposed slot 14 is provided adjacent the lower end of the plunger and is adapted to conformably receive the eccentric pin 15 on the shaft 16. This shaft is rotatable in an opening 17 in the faucet body and sealed against leakage by means of a resilient sealing ring 18 pivotally mounted in a substantially V-shaped groove 19 in the body, and at its outer end 20 is reduced and tapered to receive a handle 21. A screw 22 retains the handle in place, while the shaft and eccentric are retained in place by a snap ring 23 removably seating in an annular recess in the opening 17 provided in the body.

The plunger 11 is hollow to provide a passage 24 for the entering fluid in alignment with the cupped portion of the sealing element 7. The recess 6 receiving the sealing element is of greater depth than the seal to permit the upper end 10 of the plunger to enter as shown in Fig. 1. In fact, this recess is machined to such a depth that the end of the plunger pulls away from the seal or sealing element 7 before this end is completely out of the recess 6. This prevents the seal from extruding under high pressures.

In operation, the fluid under pressure entering the inlet 3 passes through the opening or passage 24 in the plunger and against the valve seat seal or sealing element 7. When the valve is closed, the valve seat formed by the upper end 10 of the plunger is held against the depending lip 8 of the seal and is so adjusted that there is a small amount of endwise compression on the seal, thereby giving a self-sealing action and preventing leakage under all operating conditions. When the handle 21 is turned toward open position, the eccentric 15 lowers the plunger 11 and the pressure of the fluid below the sealing element retains this seal firmly in its recess 6 and against the head of the valve body. This allows the end of the plunger to break or pull loose from the seal and further lowering of the plunger opens up a full port opening around the entire periphery of the seat or upper end 10 of the valve plunger, and permitting uninterrupted discharge of the fluid through the spout or nozzle 4.

The seal 7 and its recess 6, as well as the plunger 11 and eccentric 15, are so constructed, arranged and proportioned that the plunger cannot be opened sufficiently to permit the sealing element 7 to become completely disengaged or displaced from its recess 6.

The novel assembly has a further important advantage in that it prevents any siphoning back into the main system of dirty or contaminated water whenever the pressure in the system drops below atmospheric. Should this condition occur, the cup-shaped sealing element 7 is held on its seat 9 on top of the valve plunger 11 and due to its being loosely carried in the recess 6 will not be released from the valve seat should the valve handle be turned to open position.

Where the non-siphoning feature is not desired or required, the cup-shaped sealing element may be anchored or secured in the recess or cavity in any suitable manner such as shown in Figs. 5 or 6. As disclosed in Fig. 5, the sealing element 25 may be provided with an opening for the reception of a screw 26 and a washer 27, with the screw adapted to be received in a threaded opening 28 in the upper end of the faucet body.

Fig. 6 shows another method or manner of securing the sealing element 29 in the recess or cavity 6. This may be accomplished by providing the sealing element with an outwardly projecting annular flange 30 adapted to seat in and be retained by an annular slot or channel 31 formed in the body of the faucet and opening into the recess 6.

Having thus disclosed my invention, I claim:

1. In a faucet construction, a body provided with an inlet and an outlet for fluid and a recess provided in the body opening toward the inlet and in alignment therewith, a valve therefor comprising a hollow valve plunger slidably mounted in the inlet and having a valve seat at its outer end, a resilient cup-shaped sealing element positioned within the recess and provided with an outwardly projecting annular sealing lip disposed inwardly from the entrance to the recess, whereby as the plunger is moved toward closed position the valve seat enters the recess before it has sealing contact with the sealing lip, and disengages the sealing lip before it leaves the recess as the plunger is moved to open position, and means for moving the plunger to closed and open positions, and when the plunger is in closed position limiting the amount of axial compression it applies to the sealing lip.

2. In a sealing construction comprising a valve body having a passage therein for flow of fluid under pressure and a recess disposed opposite the passage, a hollow movable shut-off member mounted in said passage and provided with a flat seating surface on one end thereof adapted to engage conformably with said recess, a resilient sealing member having an annular depending sealing lip with a rounded edge disposed in said recess and projecting toward the seating surface, said resilient sealing member having a depth less than the depth of the recess and coacting with the seating surface on the shut-off member in such manner that the shut-off member and said recess conformably engage first to restrict the flow of fluid, after which the seating surface contacts the rounded sealing lip to positively seal the passage and axially compress the sealing member, means associated with the shut-off member for moving the latter member to closed and open positions and when said member is in closed position limiting the axial compression on the resilient seal, and space provided adjacent the rounded sealing lip between the recess and seating surface to provide room therefor when it is compressed a predetermined limit to prevent extrusion of the sealing member.

3. A faucet comprising a body having an inlet and an outlet, a plunger slidably mounted in the inlet and having a passage therethrough for the entering fluid, a recess provided in the body in alignment with the plunger, a cup-shaped resilient sealing element disposed within the recess and having an outwardly projecting sealing lip spaced inwardly from the entrance to said recess, said sealing element being maintained in the recess by the pressure of the entering fluid, the outer end of the plunger providing a valve seat adapted to enter the recess for initially restricting the flow of fluid and thereafter engaging the sealing element for preventing the passage of fluid to the outlet, an eccentric engaging the plunger for moving the latter into closed or open position and when in closed position applying a limited amount of compression to the sealing lip, and a handle connected to the eccentric for operating the plunger.

4. In a faucet construction, a body provided with an inlet and an outlet for fluid, a valve therefor comprising a movable plunger provided with a passage for the fluid and a valve seat at its outer end, a resilient sealing element loosely mounted in a recess in the body in alignment with the plunger and maintained in its recess by the pressure of the entering fluid, the sealing element having an outwardly projecting and axially compressible sealing lip positioned inwardly of the entrance to the recess, said plunger and sealing element being so constructed and arranged that when the plunger is moved to close the valve, the outer end of the plunger enters the recess and initially restricts the flow of fluid and thereafter seats against the sealing lip and thereat effects a self-sealing action, and when the plunger is moved to open the valve the outer end of the plunger pulls away from the sealing lip before this end is withdrawn from the recess, after which further movement of the plunger completely opens the valve for discharge of the fluid, and means for moving the plunger to open and close the valve and when the valve is closed providing a stop for limiting the axial compression on the sealing lip.

5. In a faucet construction, a body provided with an inlet and an outlet for fluid and a recess provided in the body opening toward the inlet, a valve therefor comprising a hollow valve plunger slidably mounted in the inlet and having a valve seat at its outer end, a resilient cup-shaped sealing element positioned within the recess and provided with an outwardly projecting sealing lip disposed in alignment with the outer end of the plunger, the plunger and sealing element being so constructed and arranged that the latter remains in the recess when fluid under pressure enters the inlet, but remains upon the valve seat if the pressure drops below atmospheric.

THOMAS R. SMITH.

REFERENCES CITED

The following references are of record in the file of this patent:

UNITED STATES PATENTS

| Number | Name | Date |
| --- | --- | --- |
| 483,795 | Stevens | Oct. 4, 1892 |
| 789,445 | O'Brien | May 9, 1905 |
| 972,431 | Beggs | Oct. 11, 1910 |
| 1,069,871 | Gillett | Aug. 12, 1913 |
| 1,259,298 | Scheid | Mar. 12, 1918 |
| 2,171,316 | Van Sittert | Aug. 29, 1939 |